United States Patent
Horne et al.

(10) Patent No.: US 11,218,787 B2
(45) Date of Patent: *Jan. 4, 2022

(54) CLIP BASED SPEAKER RETENTION TO A MOUNTING SURFACE

(71) Applicant: Avaya Inc., Basking Ridge, NJ (US)

(72) Inventors: William James Horne, Belleville (CA); Philip Lo, Ottawa (CA)

(73) Assignee: Avaya Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/931,885

(22) Filed: May 14, 2020

(65) Prior Publication Data

US 2020/0275175 A1 Aug. 27, 2020

Related U.S. Application Data (63) Continuation of application No. 16/282,694, filed on Feb. 22, 2019, now Pat. No. 10,694,273.

(51) Int. Cl.
*H04R 1/02* (2006.01)
*H04R 1/28* (2006.01)

(52) U.S. Cl.
CPC ............ *H04R 1/025* (2013.01); *H04R 1/288* (2013.01); *H04R 2201/021* (2013.01); *H04R 2400/11* (2013.01)

(58) Field of Classification Search
CPC .... H04R 1/025; H04R 1/288; H04R 2400/11; H04R 1/1075; H04R 1/28; H04R 1/2803; H04R 1/2892; H04R 1/2896; H04R 9/045; H04R 2201/02; H04R 2201/021; H04R 2201/025; H04R 7/127

See application file for complete search history.

(56) References Cited

U.S. PATENT DOCUMENTS

| | | | |
|---|---|---|---|
| 3,483,945 A * | 12/1969 | Stanley | H04R 1/323 181/143 |
| 4,815,558 A | 3/1989 | Krainhofer | |
| 4,852,178 A | 7/1989 | Inkman et al. | |
| 10,694,273 B1 * | 6/2020 | Horne | H04R 1/025 |
| 2002/0018576 A1 * | 2/2002 | Shima | H04R 1/025 381/396 |
| 2018/0361545 A1 * | 12/2018 | Ross et al. | B25B 23/0007 |
| 2020/0228900 A1 * | 7/2020 | Hiraoka | H04R 9/06 |

FOREIGN PATENT DOCUMENTS

| | | |
|---|---|---|
| EP | 1489878 A2 | 12/2004 |
| JP | 59-78787 U | 5/1984 |

* cited by examiner

*Primary Examiner* — Mark Fischer (57) ABSTRACT

The technology disclosed herein enables retention of a speaker on a mounting surface using a clip and a flange. In a particular embodiment, an apparatus includes a speaker comprising a substantially elliptic speaker frame. The apparatus further includes a mounting surface comprising a substantially cylindrical flange into which the speaker frame is positioned. Also, the apparatus includes a substantially elliptic clip positioned in the flange between the speaker frame and a retaining rim of the flange.

20 Claims, 8 Drawing Sheets

CLIP BASED SPEAKER RETENTION TO A MOUNTING SURFACE

RELATED APPLICATIONS

This application is a continuation of U.S. patent application Ser. No. 16/282,694, entitled "CLIP BASED SPEAKER RETENTION TO A MOUNTING SURFACE," filed Feb. 22, 2019, which is hereby incorporated by reference in its entirety.

TECHNICAL BACKGROUND

Traditionally, speakers have been retained on a mounting surface of a product using rear supports from a rear cover of the product or by screwing down a bracket that surrounds a perimeter of a speaker. In other cases, a speaker is fastened with adhesives on the perimeter of the speaker's frame or by screws into the mounting surface through holes in the speaker's frame. These above examples tend to require many parts (e.g., brackets, gaskets, screws, etc.), which adds to cost and amount of labor needed for assembly. Some of these examples, such as retention of a speaker using a rear cover of the product, also transmits undesirable vibrations from the speaker to the rear cover of the product. These vibrations can lead to audio distortions and require greater efforts to compensate for the loss of fidelity. Furthermore, vibrations to the rear cover can cause rattles in other components of the product.

SUMMARY

The technology disclosed herein enables retention of a speaker on a mounting surface using a clip and a flange. In a particular embodiment, an apparatus includes a speaker comprising a substantially elliptic speaker frame. The apparatus further includes a mounting surface comprising a substantially cylindrical flange into which the speaker frame is positioned. Also, the apparatus includes a substantially elliptic clip positioned in the flange between the speaker frame and a retaining rim of the flange.

In some embodiments, the clip includes a gap in the circumference of the clip. In those embodiments, on each side of the gap, the clip may include a tool grip point corresponding to a tool for positioning the clip.

In some embodiments, at least one vibration dampening element positioned in the flange to isolate the speaker from the mounting surface and the clip. In those embodiments, the at least one vibration dampening element may be of similar shape to the speaker frame.

In some embodiments, the speaker faces the mounting surface. In those embodiments, the mounting surface may include at least one opening through which sound produced by the speaker passes.

In some embodiments, the speaker faces away from the mounting surface and an opening in the mounting surface allows portions of the speaker, other than the speaker frame, to pass through the mounting surface.

In some embodiments, a telephone device includes the mounting surface.

In yet another embodiment, a method is includes positioning a substantially elliptic speaker frame of the speaker into a substantially cylindrical flange of the mounting surface. The method further includes positioning a substantially elliptic clip into the flange between the speaker frame and a retaining rim of the flange.

In some embodiments, the clip includes a gap in the circumference of the clip. In those embodiments, the method may include squeezing the clip to reduce the size of the gap such that the clip fits through the rim and into the flange and releasing the clip once the clip is in the flange. Also, in those embodiments, positioning the clip may include gripping the clip on each side of the gap using a positioning tool gripping onto grip points on each side of the gap.

In some embodiments, the method includes positioning at least one vibration dampening element in the flange to isolate the speaker from the mounting surface and the clip. In those embodiments, the at least one vibration dampening element may be of similar shape to the speaker frame.

DETAILED DESCRIPTION

The manner of audio speaker retention described herein uses fewer parts to assemble, which leads to reduced cost and a reduced amount of labor when assembling a product that includes a speaker. Furthermore, the speaker is not retained using a back face of a product, so none of the vibrations caused by the speaker producing sound are transferred through that back-face retention. Instead, the mounting surface to which the speaker is retained includes a flange into which the speaker is positioned. A clip holds the speaker within the flange when placed between the speaker's frame and a rim of the flange. Thus, to mount the speaker to the mounting surface only two parts are required, the mounting surface itself (with the required flange) and a clip, as described further below.

Figure 1:
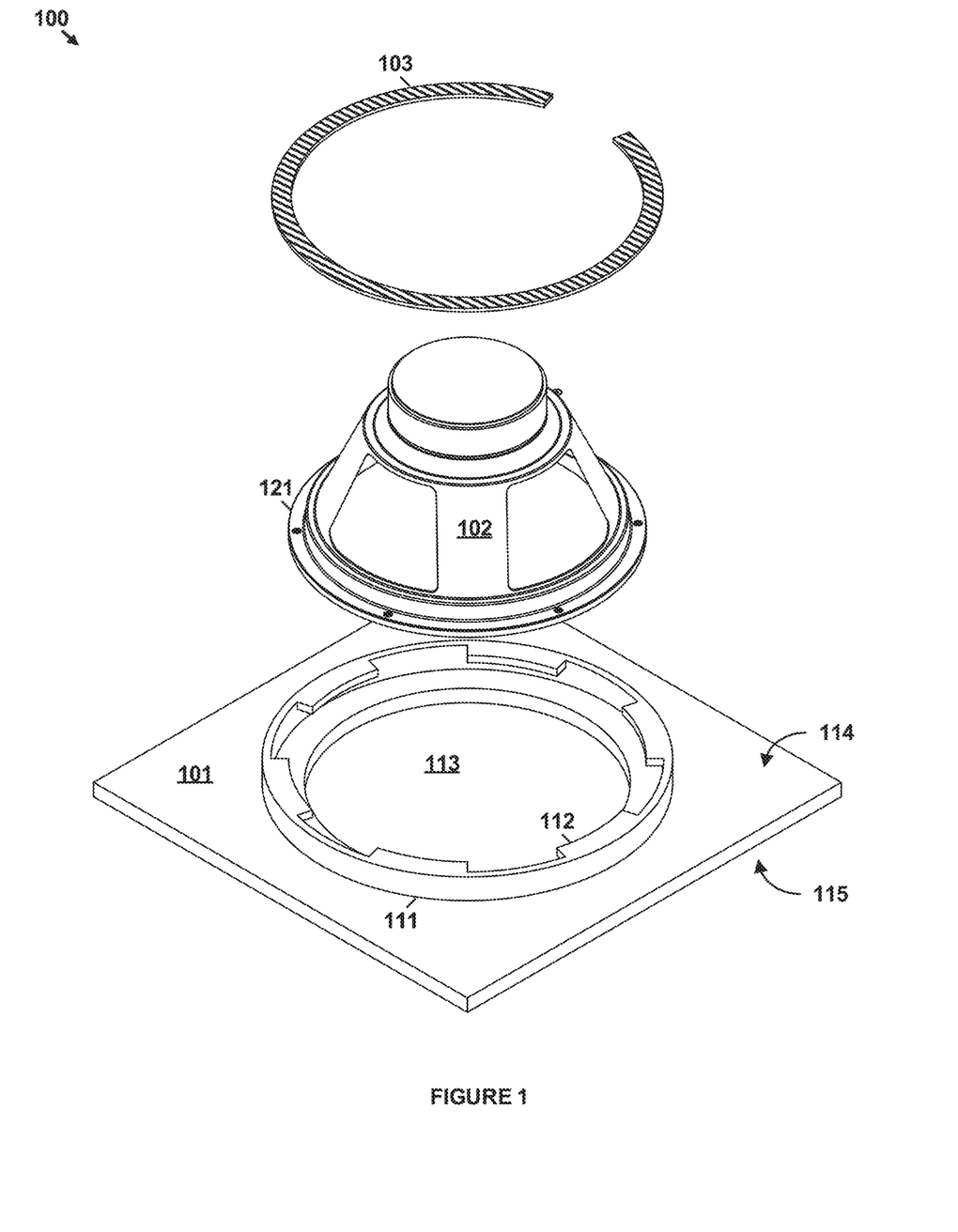
FIG. 1 illustrates a view of an unassembled speaker retention apparatus in an implementation.

FIG. 1 illustrates a view of an unassembled speaker retention apparatus 100 in an implementation. Unassembled speaker retention apparatus 100 includes mounting surface 101, speaker 102, and clip 103. Mounting surface 101 has flange 111 and flange 111 includes rim 112. For purposes of this example, the visible face of mounting surface 101 is back face 114 while the face under mounting surface 101 in its illustrated orientation is front face 115. This convention for front and back is used because typically a speaker will direct sound outward from the front face of a mounting surface. However, there may exist examples where a speaker will direct sound outward from a back face of a mounting surface.

Mounting surface 101 is preferably one piece but may also be composed of multiple pieces assembled to create mounting surface 101. For example, a one-piece mounting surface 101 may be produced from injection molded materials, such as plastic, may be 3D printed, may be casted, or may be created using some other manufacturing method. In another example, flange 111 may be mated to the rest of mounting surface 101 using an adhesive or mechanical fastener. While mounting surface 101 is shown as a simple rectangular shape with flange 111, it should be understood that mounting surface 101 may be a larger component, such as a panel for a product that includes speaker 102, and may therefore take many different shapes.

Speaker 102 in this example is a round speaker but could take other substantially elliptic shapes, such as an oval shape that is another common speaker shape. The shape of flange 111, at least the interior thereof, is similar to the shape of frame 121 of speaker 102 but is larger than frame 121 in order for speaker 102 to be positioned into flange 111. Similarly, mounting surface 101 in this example includes an opening 113 within flange 111 that allows sound generated by speaker 102 to pass through mounting surface 101. Opening 113 must be sized and/or shaped such that, once speaker 102 is positioned within flange 111, speaker 102 does not pass through mounting surface 101. While opening 113 in mounting surface 101 is similar in shape to frame 121, the opening in other examples may take other shapes and/or may include multiple openings as long as that shape or multiple opening arrangement does not allow frame 121 to pass through mounting surface 101 when placed in flange 111.

Flange 111 includes rim 112 at the top of flange 111 that reduces the internal size of flange 111 at the location of rim 112. In this example, rim 112 comprises six tabs but more or fewer tabs of different sizes may be used in other examples as long as rim 112 is still able to perform as described herein. In some cases, rim 112 may go around the entirety of flange 111 rather than being split into tabs, as shown. The number and size of the tabs may depend on the material and size of clip 103 to ensure that clip 103 can be positioned properly within flange 111 while still being rigid enough to hold speaker 102 in flange 111 once positioned. In some examples, the diameter of frame 121 may be smaller than the inner diameter of rim 112 to ensure speaker 102 can be positioned into flange 111, although, in other examples, the arrangement of tabs that make up rim 112 may such that a larger diameter frame 121 can pass through rim 112 in certain orientations.

As alluded to above, clip 103 is positioned within flange 111 after speaker 102 has been placed within flange 111. In particular, clip 103 is shaped similarly to frame 121 and flange 111 such that clip 103 can fit around all but frame 121 of speaker 102 and within flange 111 while still being held within flange 111 by rim 112. This allows clip 103 to hold speaker 102 in flange 111 since rim 112 holds clip 103 in flange 111 while clip 103 in turn holds speaker 102 within flange 111. In order to fit clip 103 under rim 112 and into flange 111 clip 103 is manipulated (e.g., bent, squeezed, flexed, or otherwise misshapen) to fit within the diameter of rim 112. Clip 103 is composed of a material, including some types of plastics and some metals, that causes clip 103 to return to its original shape, at least when manipulated to the extent necessary to fit clip 103 within rim 112, when placed in flange 111. In this example, clip 103 includes a gap in the perimeter of its elliptic shape to make manipulating the shape of clip 103 to fit through rim 112 easier. The gap forms what, in some applications, is called a c-clip and may be any size as long as it still allows clip 103 to hold speaker 102 in flange 111. In other examples, possibly depending on the material composition of clip 103, clip 103 may not include a gap in its elliptic shape and still be able to be manipulated to fit under rim 112 and into flange 111.

Figure 2:
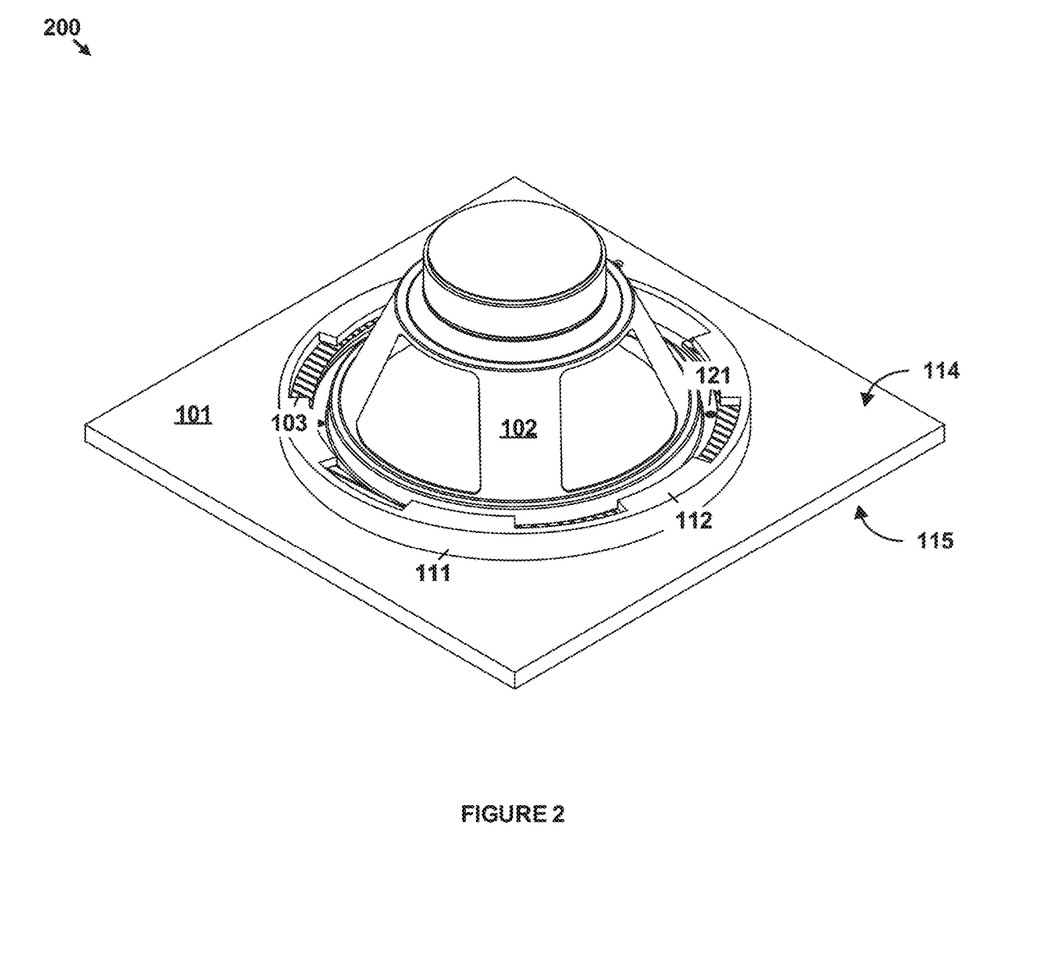
FIG. 2 illustrates a view of an assembled speaker retention apparatus in an implementation.

FIG. 2 illustrates a view of an assembled speaker retention apparatus 200 in an implementation. Assembled speaker retention apparatus 200 represents unassembled speaker retention apparatus 100 once speaker 102 and clip 103 have been positioned in flange 111 of mounting surface 101. As can be seen in assembled speaker retention apparatus 200, speaker 102 is within flange 111 and frame 121 has not passed through opening 113. Clip 103 is tucked under rim 112 and on top of frame 121 to hold speaker 102 within flange 111 and up against mounting surface 101. Preferably, clip 103 holds frame 121 tightly enough within flange 111 that frame 121 cannot move within flange 111 under normal operation of speaker 102 since the vibrations of speaker 102 and/or movement of mounting surface 101 (or the system/device of which mounting surface 101 is a part) could otherwise cause speaker 102 to move and cause undesirable effects (e.g., rattles, poor audio, etc.).

Figure 3:
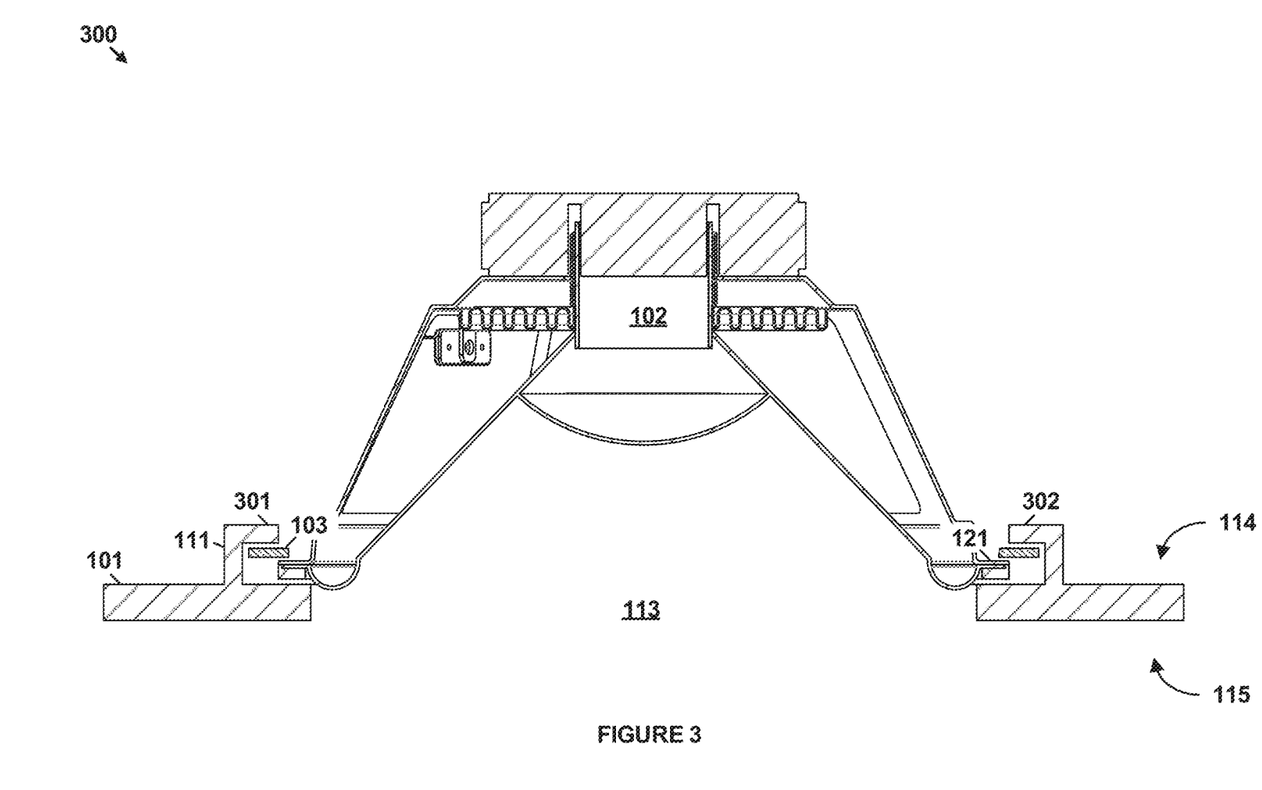
FIG. 3 illustrates a profile view of a speaker retention apparatus in an implementation.

FIG. 3 illustrates a profile view of speaker retention apparatus 300 in an implementation. Speaker retention apparatus 300 represents a cutaway through the widest part of speaker 102 in assembled speaker retention apparatus 200 where tabs of rim 112, tab 301 and tab 302, are on either side of flange 111. Speaker retention apparatus 300 clearly shows how mounting surface 101, speaker 102, and clip 103 fit together to retain speaker 102 to mounting surface 101 in flange 111. In this example, the diameter of frame 121 is smaller than the opening between tab 301 and tab 302 so speaker 102 can be placed into flange without having manipulate the orientation of speaker 102 to pass through spaces between tabs of rim 112. The diameter of frame 121 is also greater than the distance across opening 113 so that frame 121 does not pass through mounting surface 101. Clip 103 is placed above frame 121 and is wide enough on each side to overlap each of tab 301 and tab 302, and frame 121. Once in place, clip 103 effectively extends the reach of rim 112 by reducing the distance across the opening of rim 112 to prevent frame 121 from coming out of flange 111 while clip 103 is in position.

As can be gleaned from the discussion above, only the internal configuration/dimensions of flange 111 are important for retaining speaker 102. As such while the outside of flange 111 is shown as rising straight up on mounting surface 101, other external flange configurations may be used. For example, mounting surface 101 may taper to the top of flange 111 or mounting surface 101 may be thicker to reduce the amount that flange 111 protrudes from the rest of mounting surface 101 (possibly making the top of flange 111 be flush with the rest of mounting surface 101).

Figure 4:
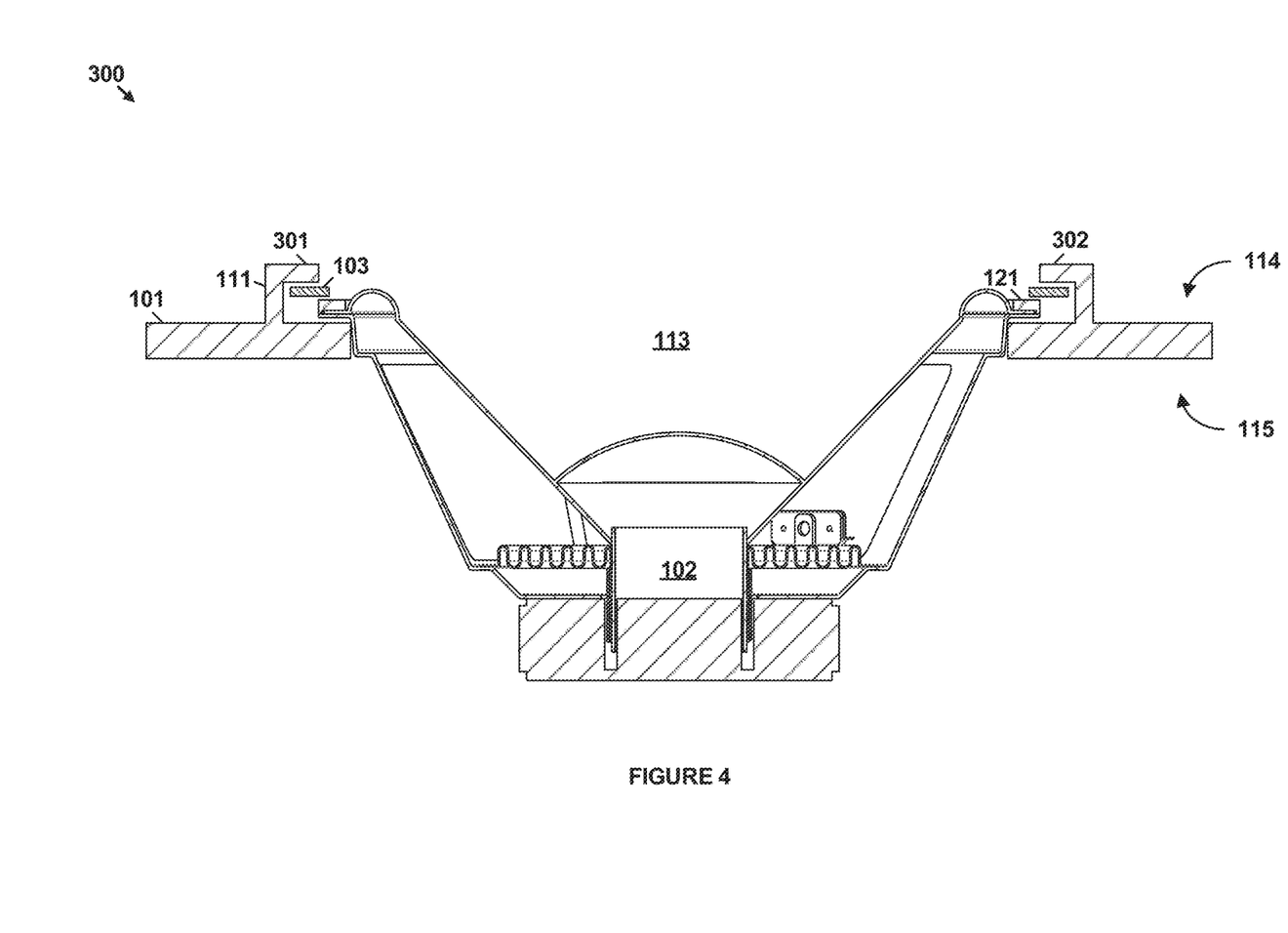
FIG. 4 illustrates another profile view of a speaker retention apparatus in an implementation.

FIG. 4 illustrates profile view of a speaker retention apparatus 400 in an implementation. The profile view in this example is similar to that of FIG. 3 but speaker 102 is positioned in flange 111 in the opposite orientation from the examples above. While the other examples show speaker 102 in an orientation that directs sound through opening 113 in mounting surface 101, speaker retention apparatus 400 directs sound through the opening between rim 112 of flange 111. In this example, back face 114 may be considered the front face of mounting surface 101. The speaker orientation of speaker 102 in speaker retention apparatus 400 may be beneficial in examples where a speaker may be changed frequently, therefore, easy access to clip 103 is advantageous. All the dimensional requirements of flange 111, rim 112, clip 103, and frame 121 remain the same as speaker retention apparatus 300, although opening 113 in this example now needs to be large enough for the components of speaker 102 to fit through. Clip 103 still holds speaker 102 in flange 111 by being placed between rim 112 and frame 121.

Figure 5:
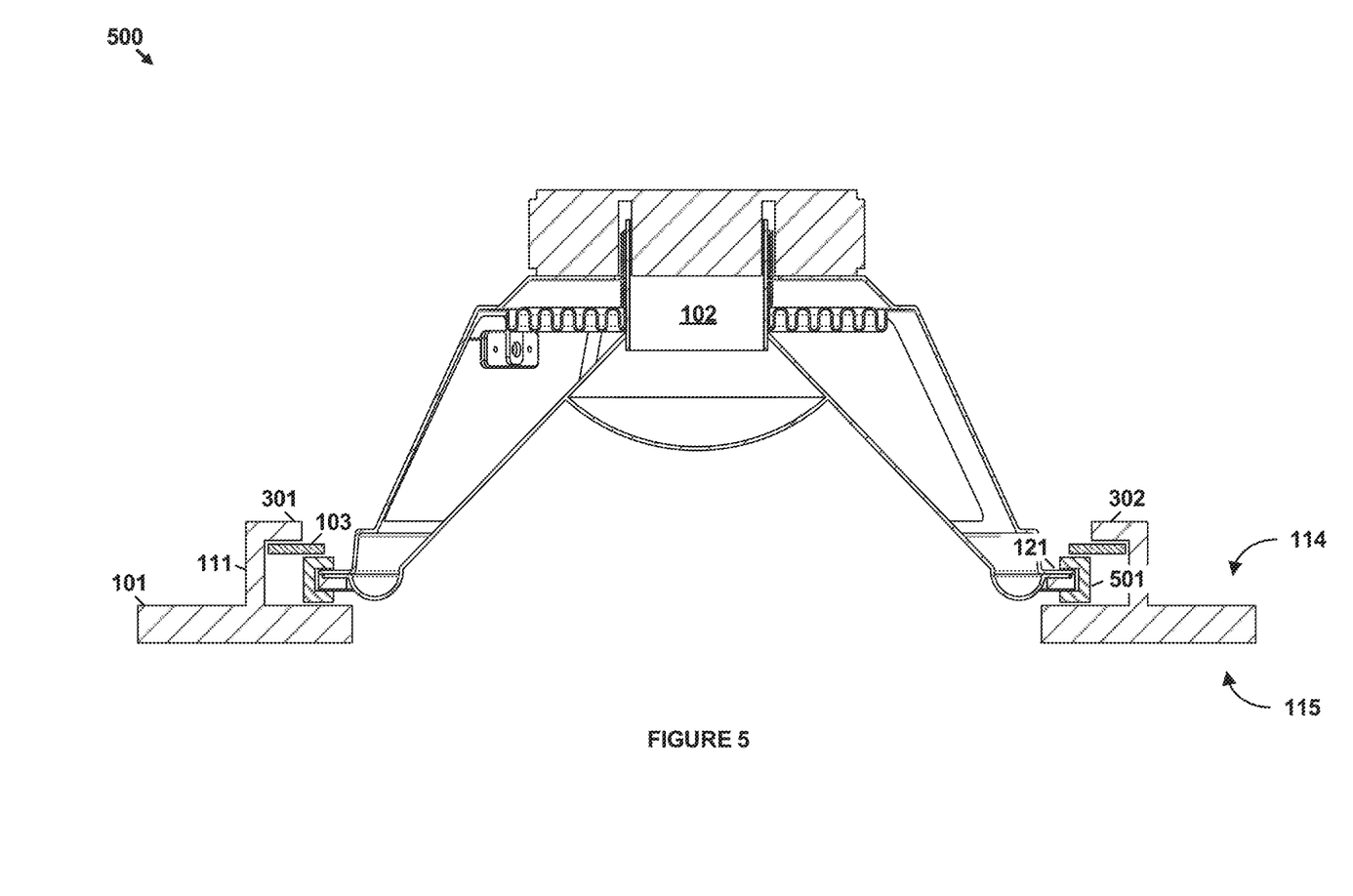
FIG. 5 illustrates yet another profile view of a speaker retention apparatus in an implementation.

FIG. 5 illustrates a profile view of a speaker retention apparatus 500 in an implementation. In this example, speaker retention apparatus 500 has a spacer 501 that helps fill extra space in flange 111 between the base of mounting surface 101 and rim 112 not taken up by frame 121 and clip 103. When seen from above, spacer 501 may have an elliptic shape similar to that of clip 103 and frame 121. Spacer 501 may have a gap similar to that of clip 103 to assist in placing spacer 501 within flange 111. In some examples, spacer 501 may be attached within flange 111 or to frame 121 and, in those examples, spacer 501 may be split into different segments like the tabs of rim 112. In some examples, spacer 501 may comprise a vibration dampening material that helps mitigate vibration transfer from speaker 102 to mounting surface 101, such as soft plastic, rubber, foam, etc. The use of spacer 501 in a vibration dampening material may be especially beneficial when frame 121 is not covered, at least partially, with a vibration dampening material, as opposed to being a harder material, such as metal or plastic. In this example, spacer 501 in profile forms around frame. In other examples spacer 501 may have a similar shape to clip 103 and at least one of which may be placed above and/or below frame 121. The use of spacer 501 may also help prevent frame 121 and clip 103 from moving around in flange 111 in examples where frame 121 and clip 103 do not otherwise fill the vertical space between mounting surface 101 and rim 112. Likewise, spacer 501 as illustrated can fill more of the space between the edge of frame 121 and the inner side of flange 111, which will help prevent side to side motion of speaker 102 within flange 111.

Figure 6:
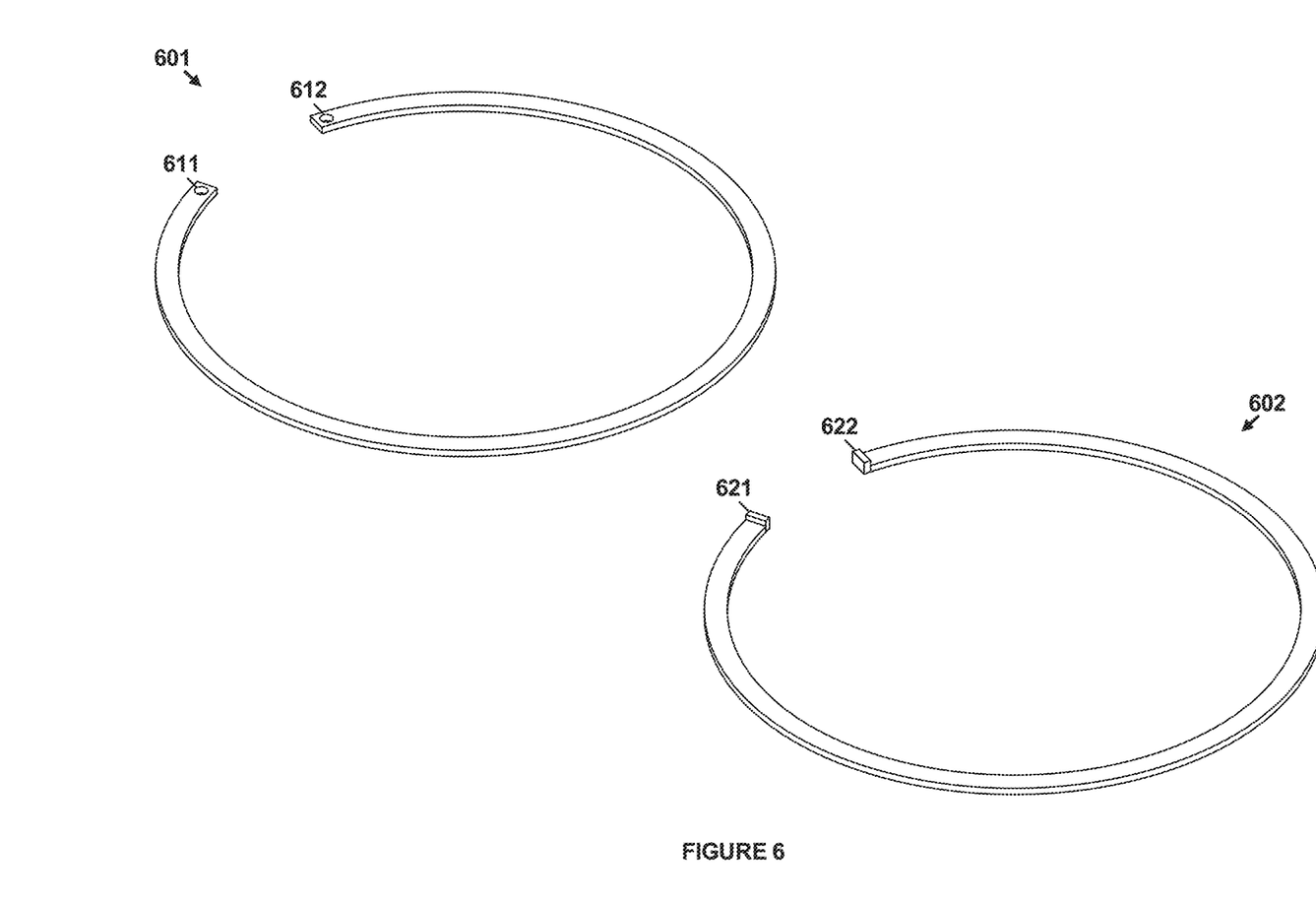
FIG. 6 illustrates clips for a speaker retention apparatus in various implementations.

FIG. 6 illustrates clip 601 and clip 602 for a speaker retention apparatus in various implementations. Clip 601 and clip 602 are alternative examples of clip 103. Clip 601 and clip 602 include physical features on either side of their respective gaps to make manipulating the shape of clip 601 and clip 602 to fit past rim 112 into flange 111. In particular, clip 601 includes hole 611 and hole 612 for into which a tool is placed when positioning clip 601 in, or removing clip 601 from, flange 111. For example, a pliers-type tool with tips narrow enough to fit into hole 611 and hole 612 may be used to squeeze clip 601 to reduce the size of the gap therein, which allows clip 601 to fit through rim 112. Clip 602 includes tab 621 and tab 622 on either side of the gap. Tab 621 and tab 622 may help a person grip clip 602 to squeeze clip 602 when placing clip 602 into, or removing clip 602 from, flange 111. Alternatively, a tool may, such as a pliers-type tool, be used to grip tab 621 and tab 622 for placement and removal.

It should be understood that, while tab 621, tab 622, hole 611, and hole 612 are each placed right next to the gaps in their respective clip 601 and clip 602, tab 621, tab 622, hole 611, and hole 612 may be positioned elsewhere on clip 601 and clip 602 as long as the functionality described above is maintained. Similarly, the grip points offered by tab 621, tab 622, hole 611, and hole 612 may take forms other than holes and tabs while maintaining the same functionality.

Figure 7:
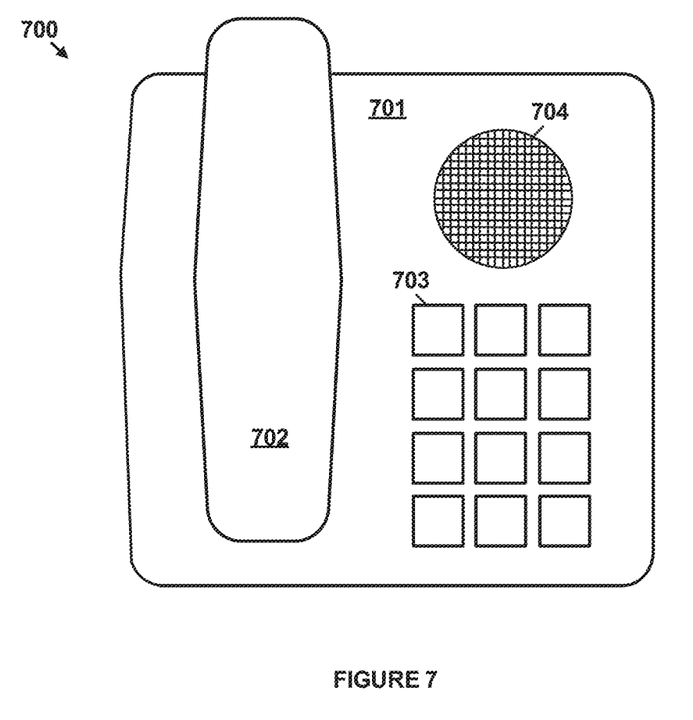
FIG. 7 illustrates a phone including a speaker retention apparatus in an implementation.

FIG. 7 illustrates phone 700 including a speaker retention apparatus in an implementation. Phone 700 includes face plate 701, handset 702, and dial pad 703. Handset 702 and dial pad 703 are common telephone components used to talk and user input. Face plate 701 is an example of mounting surface 101 when incorporated into a larger device. The entirety of face plate 701 may be one continuous piece or may be comprise of multiple pieces assembled together. The front of face plate 701 is currently in view in FIG. 7. The front of face plate 701 is an example of front face 115 of mounting surface 101 and includes speaker cover 704. Speaker cover 704 in this example includes a cross hatching of face plate 701's material to allow passage of sound generated by a speaker mounted to the back of face plate 701 in the manner described herein. Speaker cover 704 is therefore an example of opening 113 from above. In other examples, speaker cover 704 may be made of materials different from the rest of face plate 701 (e.g., may be a mesh insert). While not shown, a flange similar to flange 111 exists on the back of face plate 701 and a speaker is retained therein, facing outward through speaker cover 704, by a clip similar to clip 103 in a manner similar to that described in FIGS. 1-3 and/or 5 above.

Figure 8:
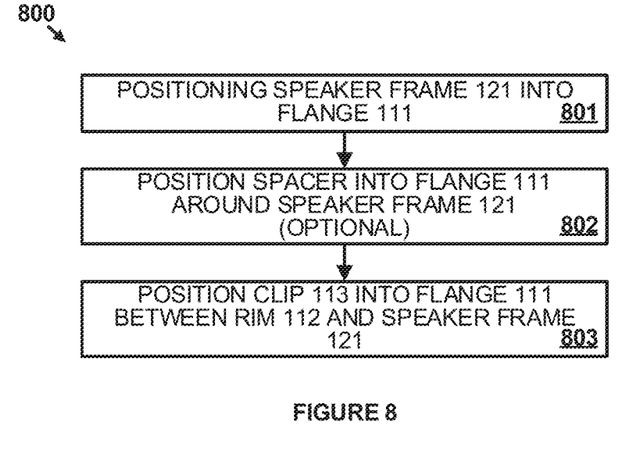
FIG. 8 illustrates a flow diagram for assembling a speaker retention apparatus in an implementation.

FIG. 8 illustrates a flow diagram representing method 800 for assembling a speaker retention apparatus in an implementation. Method 800 includes positioning frame 121 of speaker 102 into flange 111 (801). Speaker 102 may be positioned such that speaker 102 faces into flange 111 and towards back face 114, as shown in FIGS. 1, 2, 3, and 5, or may be positioned such that speaker 102 faces out of flange 111 and away from back face 114. In some examples, spacer(s) 501 may be positioned around frame 121 for vibration dampening, space filling, movement limiting, or for some other reason (802).

After speaker 102 (and spacer(s) 501 if used) are positioned, clip 103 is position into flange 111 between frame 121 and rim 112 to hold speaker 102 (and spacer(s) 501 if used) within flange 111 (803). As discussed above, clip 103 may be squeezed so as to reduce the size of a gap therein, which reduces the dimensions of clip 103 enough to pass through rim 112. Clip 103 can then be released once past rim 112 and in flange 111 so that clip 103 can return to dimensions that retain clip 103 within rim 112. In some cases, grip points like those shown in FIG. 6 may be used to squeeze clip 103. Other manners of manipulating clip 103 past rim 112 and into flange 111 may also be used.

While the above examples focus on retaining an audio speaker to a mounting surface, other types of similarly shaped audio components may be retained in a similar manner. For example, a microphone with an elliptic frame similar to the speaker frames described above may be retained within a flange of a mounting surface using a clip between the frame and a rim of the flange.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. An apparatus for audio component retention, comprising:
    an audio component comprising a frame;
    a mounting surface comprising a flange, wherein the frame is positioned into a first portion of the flange, wherein the flange is substantially cylindrical; and
    a clip positioned in the first portion of the flange between the frame and a retaining rim of the flange, wherein the retaining rim comprises a second portion of the flange with a smaller inner diameter than the first portion of the flange, and wherein the shape of the clip was manipulated to fit the clip through the retaining rim and into the first portion of the flange.

2. The apparatus of claim 1, wherein the clip includes a gap in a perimeter of the clip.

3. The apparatus of claim 2, wherein, on each side of the gap, the clip includes a tool grip point corresponding to a tool for positioning the clip.

4. The apparatus of claim 1, further comprising:
at least one vibration dampening element positioned in the first portion of the flange to isolate the audio component from the mounting surface and the clip.

5. The apparatus of claim 4, wherein the at least one vibration dampening element is of similar shape to the frame.

6. The apparatus of claim 1, wherein the audio component faces the mounting surface.

7. The apparatus of claim 6, wherein the mounting surface includes at least one opening through which sound passes.

8. The apparatus of claim 1, wherein the audio component faces away from the mounting surface and an opening in the mounting surface allows portions of the audio component, other than the frame, to pass through the mounting surface.

9. The apparatus of claim 1, wherein the mounting surface is included in a device that uses the audio component.

10. The apparatus of claim 1, wherein the audio component comprises a microphone.

11. A method for retaining an audio component to a mounting surface, comprising:
positioning a frame of the audio component into a first portion of a flange of the mounting surface, wherein the flange is substantially cylindrical; and
positioning a clip into the first portion of the flange between the frame and a retaining rim of the flange, wherein the retaining rim comprises a second portion of the flange with a smaller inner diameter than the first portion of the flange, and wherein the shape of the clip is manipulated to fit the clip through the retaining rim and into the first portion of the flange.

12. The method of claim 11, wherein the clip includes a gap in a perimeter of the clip.

13. The method of claim 12, wherein positioning the clip comprises:
squeezing the clip to reduce a size of the gap such that the clip fits through the rim and into the first portion of the flange; and
releasing the clip once the clip is in the first portion of the flange.

14. The method of claim 13, wherein positioning the clip comprises:
gripping the clip on each side of the gap using a positioning tool gripping onto grip points on each side of the gap.

15. The method of claim 11, further comprising:
positioning at least one vibration dampening element in the first portion of the flange to isolate the audio component from the mounting surface and the clip.

16. The method of claim 15, wherein the at least one vibration dampening element is of similar shape to the frame.

17. The method of claim 11, wherein the audio component faces the mounting surface.

18. The method of claim 17, wherein the mounting surface includes at least one opening through which sound passes.

19. The method of claim 11, wherein the audio component faces away from the mounting surface and an opening in the mounting surface allows portions of the audio component, other than the frame, to pass through the mounting surface.

20. The method of claim 11, wherein the mounting surface is included in a device that uses the audio component.

* * * * *